May 17, 1927.
A. B. SHULTZ ET AL
1,628,811
SHOCK ABSORBER
Filed May 19, 1926
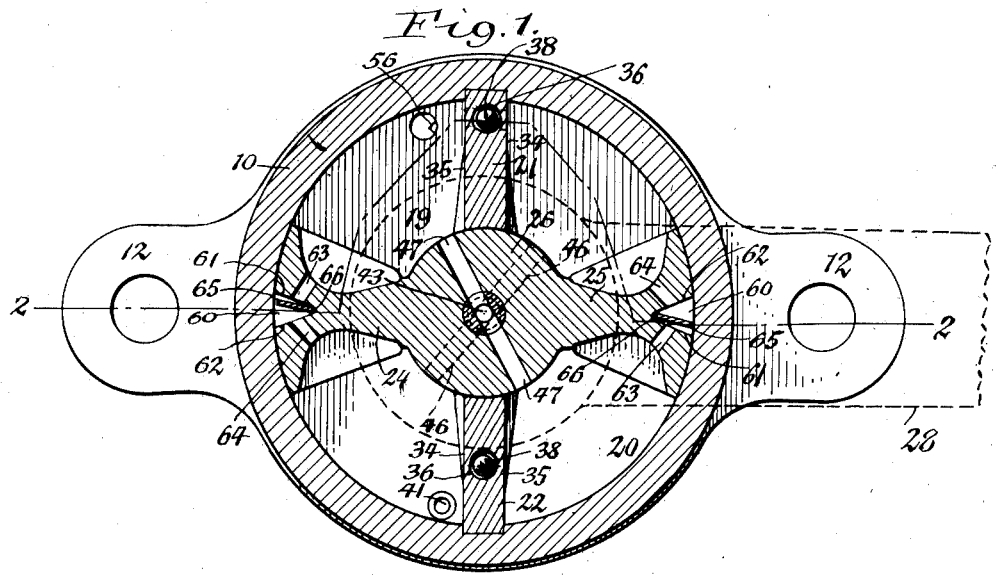
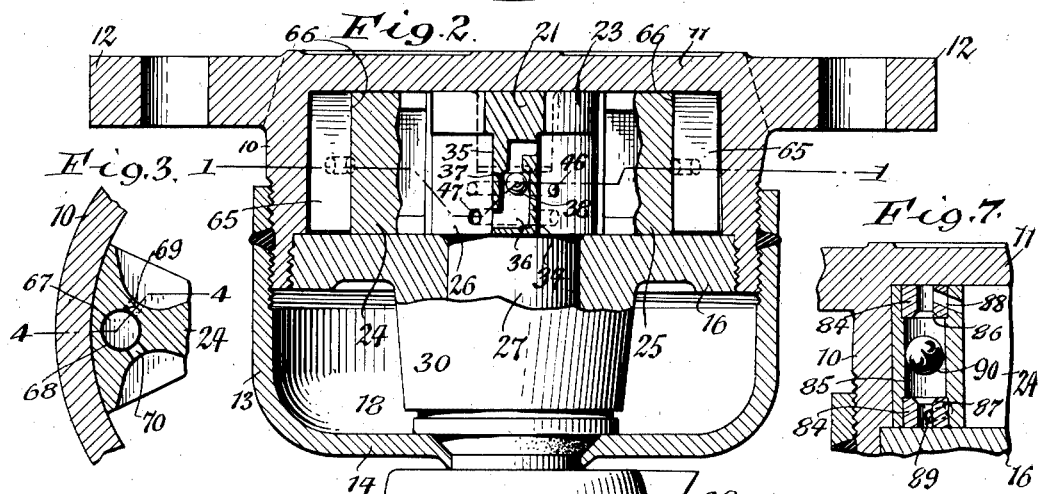
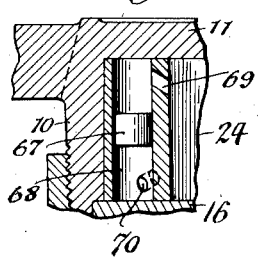
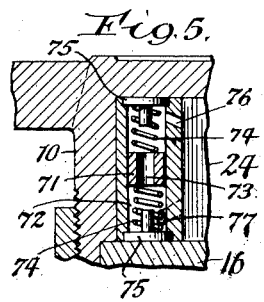
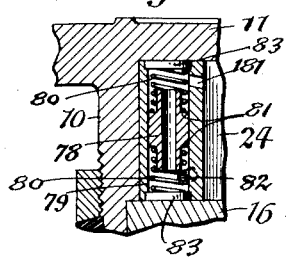
Inventors
A. B. Shultz
A. B. Casper
by Poffe Powers
Attorneys Patented May 17, 1927.

1,628,811

UNITED STATES PATENT OFFICE.

ALBERT B. SHULTZ AND ANTHONY B. CASPER, OF BUFFALO, NEW YORK, ASSIGNORS TO HOUDE ENGINEERING CORPORATION, OF BUFFALO, NEW YORK, A CORPORATION OF NEW YORK.

SHOCK ABSORBER.

Application filed May 19, 1926. Serial No. 110,101.

This invention relates to a shock absorber which is more particularly designed for cushioning the shock on automobiles in passing over rough or uneven roads, and is of that type in which a fluid resistant is employed to absorb or reduce the shock.

When driving over roads which are substantially even or smooth it is desirable to eliminate as far as possible, any restraining effect of the shock absorber and permit the usual spring suspension of the automobile to support the load of the body on the axle so as to secure the maximum ease and comfort in riding in the car, but when a rough or uneven surface is encountered in the road which produces an abnormal deflection in the spring system, then the full capacity of the shock absorber should come into play to restrain and absorb the shock, and thereby prevent undue strain on the car or discomfort to the passengers.

In shock absorbers of this type as heretofore constructed, it has been necessary to accurately set the parts so that the same functioned properly relative to a predetermined central position or neutral zone of vibration, and if the position changed due to settling of the car springs or other conditions, then a readjustment of the connections between the shock absorber and the car was necessary in order to cause the absorber to function properly.

One of the objects of this invention is to provide a shock absorber of the hydraulic type in which a comparatively free or unrestricted flow of the fluid resistant is permitted during the central or normal range of movement or neutral zone of vibration of the relatively movable members of the automobile between which the shock absorber is interposed and this flow is arrested and practically the full cushioning effect of the same is obtained in the event that a sudden or materially increased load is put upon the absorber upon driving over rough parts of a roadway, thereby automatically adapting the shock absorber to suit different road conditions.

A further object of this invention is to so organize the means which control the flow of fluid resistant that the same automatically establishes the central or neutral position thereof, thereby avoiding the necessity of accurately centering the shock absorber when installing the same, and also rendering it unnecessary to reset the absorber when the car springs settle or other modifying conditions arise.

In the accompanying drawings:

Figure 1 is a vertical cross section of a shock absorber embodying one form of our invention, taken on line 1—1, Fig. 2.

Figure 2 is a horizontal section of the same taken on line 2—2 Fig. 1.

Figure 3 is a fragmentary vertical section showing a modified form of our improved shock absorber.

Figure 4 is a fragmentary longitudinal section taken on line 4—4 Fig. 3.

Figures 5, 6 and 7 are fragmentary longitudinal sections, similar to Fig. 4, showing further modifications of our invention.

Similar characters of reference indicate like parts in the several figures of the drawings.

The casing of the shock absorber comprises a rear section having an annular side wall 10 which is closed at its rear end by a transverse wall 11, having ears 12 for attaching the same to one of the relatively movable parts of an automobile, such as the frame, and a front section having an annular side wall 13, which is closed at its front end by a transverse front wall 14, while its rear end is connected by a screw joint with the front end of the side wall of the rear casing section. The space within the casing is divided by a main transverse partition 16 which is preferably secured at its periphery in the bore of the side wall of the rear casing section, by a screw joint. The space within the front casing section forms a storage chamber 18 for the oil, glycerine or the like which serves as the shock absorbing or resisting medium and which is held in reserve for supplying the pressure chambers 19, 20 with liquid as required.

The pressure chambers 19, 20 are semi-cylindrical and formed in the rear casing section by a diametrical partition therein, composed of two radial walls 21, 22 fitted at their outer ends in the bore of the side wall 10 and engaging their rear ends with the rear transverse wall of the rear casing section, and their front ends with the main partition 16, and the inner edges of said walls 21, 22 being connected by a central disk 23.

Arranged within the pressure chambers, respectively, are two pistons 24, 25 which oscillate therein and are connected at their inner ends by a hub 26 which is interposed between the partition disk 23 and the main partition 16.

Projecting forwardly from the hub of the pistons is a main operating shaft 27 which extends through the main partition, the storage chamber and the front wall of the latter, to the exterior of the casing and is provided on its outer extremity with a rock arm 28 which is adapted to be connected with the axle of the car or other part which moves relatively to the frame. The operating shaft is journaled in a bearing formed in a sleeve 30 on the main partition.

Each of the pressure chambers is normally filled with a pressure resisting liquid such as oil or glycerine on opposite sides of the piston therein, and means are provided which permit the liquid to flow comparatively free from one side to the other of each partition while the piston is moving backwardly and effecting a low pressure stroke; but a reverse flow through the partition is prevented, thereby offering a comparatively greater resistance while the piston is moving forward in the direction which effects a high pressure stroke of the piston.

Suitable means for this purpose consist of a check passage 36 arranged in each piston and extending from the low pressure side 34 to the high pressure side 35 of the same, and provided with a valve seat 37 facing toward the high pressure side of the piston, and a check valve 38 arranged in the check passage and movable toward and from the seat 37, as best shown in Fig. 2.

During the forward or high pressure stroke of the pistons the check valves 38 engage their seats and prevent the passage through the partitions of resistance liquid whereby the movement of the pistons is retarded during rebound of the automobile springs. The movement of the pistons in the opposite direction is however attended with little resistance because the valves 38 at this time open automatically under liquid pressure and permit the passage of liquid from the low pressure to the high pressure side of the piston while the springs of the auto are deflected under a shock or sudden load.

Wastage of liquid in the pressure chambers is replenished by the flow of resisting liquid from the storage chamber 18 through a passage 41 in the lower part of the main partition 16 which passage contains a check valve which permits flow of resistance fluids from the storage chamber to the lower pressure chamber but prevents the flow of the same in the opposite direction. Air is permitted to escape from the upper part of the cylinder to the storage chamber through a vent opening 56 in the partition.

Formed lengthwise in the operating shaft and the hub of the pistons is a main relief passage 43 which communicates with rear branch relief passages 46 extending transversely through the bushing and the adjacent part of the piston hub to the periphery of the latter on the trailing or lower pressure sides of the pistons. The main passage 43 also communicates with front branch relief passages 47 extending transversely through the adjacent part of the piston hub to the periphery of the latter on the advancing or high pressure side of the pistons. These relief passages permit a part of the resistance fluid in front of the advancing side of each piston to flow to the trailing side thereof so as to produce a gradual cushioned resistance to the movement of the piston.

Means are provided whereby a practically free flow of resistance fluid is permitted in each pressure chamber from one side to another of the piston therein, when the automobile is running over a comparatively even or smooth road and thereby permit the usual spring suspension system at this time to carry the load easily and with greatest comfort to the passengers and safety to the load, but when the automobile passes over deep ruts or strikes high obstructions in the road the sudden and increased movement of the axle and body of the car relative to each other at this time, will interrupt the free flow of resistant fluid and thus cause the latter to absorb the shock and prevent dangerous shock to the load or discomfort to the passengers.

The means for accomplishing this purpose in accordance with our invention may be variously constructed, that form shown in Figs. 1 and 2 being organized as follows:

Formed lengthwise on the outer edge of each piston or wing is a valve chamber 60 which is preferably V-shaped in cross section and opens on its outer side toward the peripheral wall of the pressure chamber and also opens at its opposite ends toward the transverse walls 11, 16 of the same. The sides of this valve chamber form outwardly diverging valve seats 61, 62 and from these seats two ports 63, 64 extend to the opposite sides of the respective piston so that the valve chamber 60 and these two ports together form a by-pass or passage through this piston for the flow of the resistance fluid in the pressure chamber from one side of the piston to the other.

Within each of the valve chambers is arranged a loose by-pass valve 65 having the form of a flat plate which rests pivotally at its inner longitudinal edge in the corner or angle 66 between the valve seats 61, 62, so as to be capable of turning thereon while its outer longitudinal edge and its transverse end edges are separated slightly from the peripheral and transverse walls, respectively, of the pressure chamber, as shown in Figs. 1 and 2.

While the car is running over roads which are comparatively even and very little relative movement of the axle and body of the car occurs, the range of movement of each piston in its pressure chamber is comparatively slight and slow so that the by-pass valve floats loosely in its valve chamber and engages with neither of the companion valve seats, thereby permitting the resistance fluid to flow through the respective by-pass with comparative freedom and offer no perceptible resistance to the oscillating movement of the piston.

A practically inappreciable resistance is therefore exerted at this time to the relative movement of the body and axle of the car, whereby the load is virtually suspended on the springs alone and carried thereby easily and freely with practically no interference from the shock absorber while the same is operating in the neutral zone or normal range of its movement.

When, however, the car is subjected to shock such as is experienced when dropping into a hole or striking a pronounced obstruction in the road then the increased extent and speed of the relative movement of the body and car, particularly during rebound, causes each piston or wing to be moved a greater extent and at a more rapid rate from its central or neutral position, thereby causing the pressure of the resistance fluid flowing through the by-pass to move this valve against that valve seat of the valve chamber which is next to the trailing side of the respective piston, whereby the flow of fluid through the by-pass is arrested and the fluid in the pressure chamber on the advancing side of the piston is confined more closely. As a result of the action of each by-pass valve, the resistance offered by the fluid in the pressure chamber in front of each piston is materially increased and this fluid is caused to absorb the greater shock which is imposed on the car due to increased heft and speed of the load at this time, thereby saving the passengers from discomfort and any materials carried in the car from destructive jarring action.

This manner of operation of the by-pass valve occurs either when the piston is moving in one direction or the other, inasmuch as the by-pass valve will close the by-pass and prevent the passage of resistance fluid by engaging either one or the other of the seats 61, 62 in the by-pass valve chamber, and excess movement of the piston will be checked both during movement of the spring toward as well as away from the body of the car upon travelling over rough roads.

By means of this form of by-pass mechanism, the neutral or normal range of movement or action of each piston may be established in any part of the respective pressure chamber because this valve mechanism will function in the manner described regardless of whether the piston is exactly in the center of the pressure chamber after the shock absorber has been installed on an automobile. It follows from this that the length of links or other means which connect the rock arm of the pistons with the axle or other part of the car, need not be accurately determined before-hand in order to get the desired results. Nor is it necessary to readjust or reset or vary the length of such linkage if the automobile in time settles, as has been necessary heretofore, because in the present case the central range or neutral zone where resistance is reduced to a minimum, is established automatically by this by-pass valve mechanism.

Instead of employing the form of by-pass valve mechanism shown in Figs 1 and 2, the same may be organized as shown in Figs. 3 and 4. The by-pass valve mechanism shown in the last mentioned figures consists of a cylindrical by-pass valve 67 which fits loosely and is slidable lengthwise in a valve chamber 68 formed lengthwise in the piston and having its opposite ends closed by the transverse walls 11, 16, of the pressure chamber, and ports 69, 70, extending from said valve chamber near opposite ends thereof to opposite sides of the respective piston. In this construction the by-pass valve floats back and forth in the central part of the valve chamber during slight vibrations of the piston which still permits fluid to flow through the by-pass chamber, but during a violent or quick movement of the piston due to a heavy shock, the valve 67 moves to one end or the other of the valve chamber and closes one or the other of the ports, due to the pressure of the fluid against the same, and thus closes the by-pass and produces an increased fluid resistance in front of the piston for cushioning the shock.

If desired, a by-pass valve 71 may be employed which is constructed in the form of a cylinder which fits closely in the cylindrical by-pass valve chamber 72, as shown in Fig. 5 and in this case the valve is provided with a longitudinal opening 73 so that in effect it forms a tube, and it is yieldingly held in a central position by springs 74 interposed between opposite ends of this valve and heads 75 arranged in opposite ends of the chamber 72. While in this central position, the valve 71 uncovers the ports 76, 77 leading from opposite ends of the valve chamber 72 to the opposite sides of the piston so that the resistance fluid can flow through the piston during mild movements of the same. But, if the piston is subjected to vigorous movement the fluid pressure against one end of the by-pass valve causes it to move with its opposite end over the respective port and thereby cut off the flow of resistance fluid through the piston, and increase the cushioning effect accordingly.

Another form of by-pass valve mechanism shown in Fig. 6 consists of a tubular by-pass valve 78 held yieldingly in its central position within a valve chamber 79 in the piston by springs 80, 80 engaging with shoulders 81, 81 on the valve. During low pressure the resistance fluid flows through the ports 181, 82, the by-pass chamber and the tubular valve, but during high pressure the by-pass valve is moved lengthwise by the fluid so that one or the other of its ends engages one or the other of the heads 83 at opposite ends of the valve chamber and arrests the flow of fluid through the by-pass of the piston.

A still further variation of this invention, shown in Fig. 7, consists of two tubular bushings 84, 84, arranged in opposite ends of the valve chamber 85 and provided with opposed valve seats 86, 87 and connected respectively by ports 88, 89, with the pressure chamber on opposite sides of the piston, and a ball valve 90 arranged loosely within the by-pass chamber 85, and engaging neither valve seat 86, 87 during low fluid pressure so as to permit the passage of fluid through the piston while driving over good roads, but the same is held by fluid pressure against one of said seats and thus increases the fluid resistance and cushioning effect when the car passes over bad roads.

In all of these modified forms of our invention the operation and advantages are the same as those described with reference to the structure shown in Figs. 1 and 2.

We claim as our invention:

1. A shock absorber comprising a pressure chamber adapted to contain a resistant fluid, a piston reciprocable in said pressure chamber and having a passage therethrough which opens into said chamber on opposite sides of said piston, and which has a central valve chamber and ports leading from opposite sides of said valve chamber to opposite sides of said piston, and a plate valve which is movably arranged in said valve chamber and which in its central position uncovers both of said ports and permits the flow of resistant fluid through said passage, but which at either end of its movement, closes one of said ports and prevents such flow.

2. A shock absorber comprising a pressure chamber adapted to contain a resistant fluid, a piston which is reciprocable therein and which is provided in one of its edges with a V-shaped valve chamber opening toward a wall of said chamber, and forming outwardly diverging valve seats, and ports extending from said valve seats to opposite sides of said piston, and a plate valve arranged in said valve chamber and turning at one edge on the corner between said seats and adapted in its central position to uncover both of said valve seats and permit the flow of resistant fluid through said passage and to move in engagement with either of said seats and prevent the flow of resistant fluid through said passage.

In testimony whereof we hereby affix our signatures.

ALBERT B. SHULTZ.
ANTHONY B. CASPER.